United States Patent [19]

Tkac

[11] Patent Number: 4,961,517
[45] Date of Patent: Oct. 9, 1990

[54] DECORATING CAKES

[76] Inventor: Angela Tkac, 3714 SE. 6th Ave., Cape Coral, Fla. 33904

[21] Appl. No.: 804,766

[22] Filed: Dec. 5, 1985

[51] Int. Cl.⁵ .............................................. B65D 35/22
[52] U.S. Cl. ..................................... 222/94; 222/568; 383/111
[58] Field of Search ...................... 222/94, 93, 92, 107, 222/103, 104, 214, 206, 136; 383/38, 111, DIG. 6, 109

[56] References Cited

U.S. PATENT DOCUMENTS

| | | | |
|---|---|---|---|
| 608,958 | 8/1898 | Ferraioli | 222/94 |
| 3,182,728 | 5/1965 | Zabriskie | 222/94 |
| 3,224,640 | 12/1965 | Schneider et al. | 383/38 |
| 3,847,523 | 12/1974 | Parrish et al. | 222/568 |
| 3,866,800 | 2/1975 | Schmitt | 222/94 |
| 4,585,149 | 4/1986 | Zulauf | 222/94 |

FOREIGN PATENT DOCUMENTS 1462356  11/1966  France .................................. 222/94

Primary Examiner—Joseph J. Rolla
Assistant Examiner—Kenneth Noland
Attorney, Agent, or Firm—Alfred E. Wilson

[57] ABSTRACT

A cake decorating dispenser for simultaneously applying a plurality of adjacently positioned or contacting different icings or differently colored icings on cakes. In the decorating of cakes it is desirable to be able to apply a name or a message to the party to whom the cake is being given, such for example as "Happy birthday", and including the name of the party to whom the cake is being given. Hertofore it has been common practice to write the name of the party to whom the cake is being given in icing of a single color. It is recognized that it would be desirable to write the message, and the party's name in two or three or even more colors of icing dispensed in parallel adjacent ribbons of icing. It has been common practice to dispense the icing used to transmit the message from a cake decorating pastry bag having a decorating tip through which the icing is forced to flow to write the message on the cake. I have devised a method by which a plurality of differently colored icings adjacently positioned or touching each other can be simultaneously dispensed through a decorating tip to substantially increase the appearance of the decorated cake.

2 Claims, 1 Drawing Sheet

DECORATING CAKES

FIELD OF THE INVENTION

This invention relates to the Confectioner's field of bakery goods, and more particularly to the application of icing or frosting on cakes. When it is desired to apply special decoration, such as a name or a message to cakes, it is common practice to put the desired icing or frosting in a cake decorating dispensing bag having a selected dispensing tip, and to squeeze the bag to dispense the icing through the decorating tip. Heretofore it has been considered impossible to apply a plurality of adjacently positioned or touching different icings or frostings or different colors of icings or frostings to cakes.

BACKGROUND OF THE INVENTION

It is recognized that where special decorations are to be applied to cakes, such for example as the addition of a name or a message, it is desirable to empty adjacently positioned or touching strips or ribbons of decorations, particularly where the adjacently positioned strips or ribbons are of different colors.

DESCRIPTION OF THE PRIOR ART

Heretofore attempts have been made to apply adjacently positioned ribbons or strips separately, but great difficulties have been encountered because of the care that must be taken to insure a uniformity of the positioning of the strips. As a result, a single ribbon or strip has been accepted as standard for the designation of a special name or message on a decorated cake.

SUMMARY OF THE INVENTION

Briefly stated this invention renders it possibleie to expand the art of decorating cakes by applying a plurality of adjacent or touching strips or ribbons of icing or frosting of the same or of different colors to cakes. This desirable result is achieved by positioning in a cake decorating pastry dispensing bag a liner having a plurality of dispensing chambers having adjacently positioned outlets aligned with a dispensing tip. The adjacently positioned or touching ribbons of icing are dispensed from the cake decorating pastry bag by squeezing the bag to induce the flow of icing from all of the aligned outlets of the separate dispensing chambers to the decorating tip where it is discharged onto the cake.

DESCRIPTION OF THE PREFERRED EMBODIMENT

Figure 2:
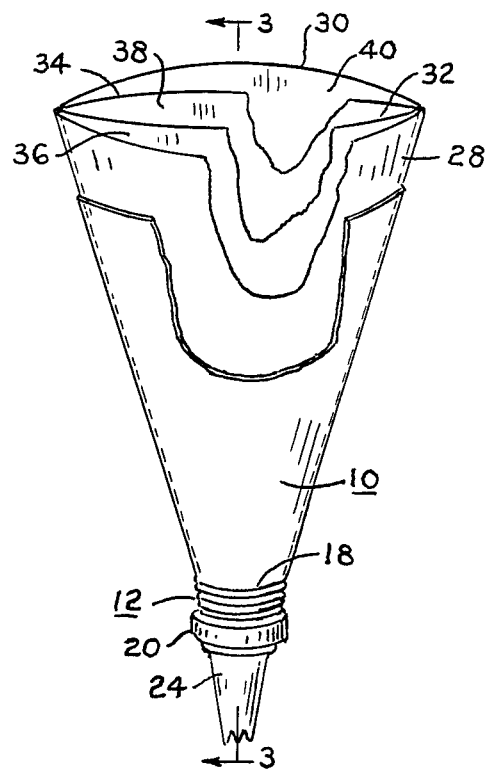
FIG. 2 is a perspective view, partly in section of the liner of FIG. 1 assembled in a cake decorating dispensing pastry bag.
Figure 3:
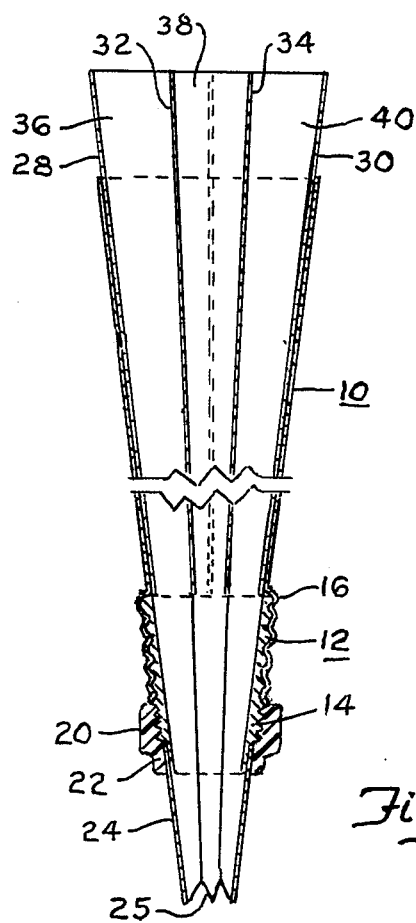
FIG. 3 is a sectional view taken substantially on the line 3—3 of FIG. 2, looking in the direction of the arrows.

Referring now to the drawings, FIGS. 2 and 3 illustrate a cake decorating pastry bag 10 assembled with a threaded coupler base 12 having a threaded lower end 14, and an outwardly flared conical upper end 16. The lower conical end 18 of the pastry bag 10 projects over the coupler base 12, and is a tight fit relative thereto to insure a leak proof connection therewith. A threaded coupler ring 20 having an inwardly flared contraction 22 is adapted to engage the upper outwardly flared end of a selected decorating tip 24 to clamp the selected decorating tip 24 to the lower contracted conical end 18 of the threaded coupler ring.

It will be understood that a wide variety of conical decorating tips 24 are available having varying discharge outlets ranging from round with pointed spears 25 to provide any desired contouring ranging from a round strip or ribbon to a contouring having pointed radially extending projections, to fit elongated contouring.

Figure 1:
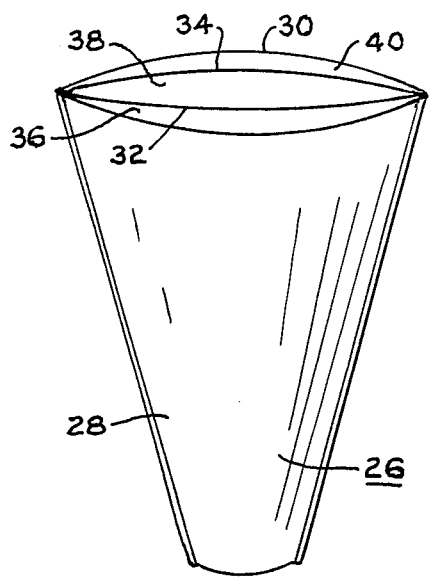
FIG. 1 is a prespective view of a liner having a plurality of separate compartments for different icings or frostings of the same or different colors.

FIG. 1 illustrates a liner 26 of conical contouring to fit into the pastry dispensing bag 10 illustrated in FIG. 2. The liner 26 also preferably of conical shape having front and back panels 28 and 30. The liner 26 also has intermediate panels such for example as the panel 32 and 34 between the front and back panels 28 and 30 to provide therebetween three chambers 36, 38 and 40. It will of course be understood that if it is only desired to provide two adjacent strips or ribbons of decorative material a single intermediate panel 32 or 34 will be provided, and that if more than three colors of different icing are desired a greater number of intermediate panels 32 and 34 will be employed.

It will be noted that the liner 26 illustrated in FIG. 1 having the plurality of chambers 36, 38 and 40 fit into the pastry bag 10 of FIG. 2 relatively close to the flared upper end 16 of the coupler base 12. It is therefore possible when one liner 26 is emptied to immediately place another properly charged liner and proceed with the cake decorating operation without any interruption. It is thus also possible to change colors quickly if desired because the icing being dispensed does not contact the icing dispensing bag 10.

Figure 4:
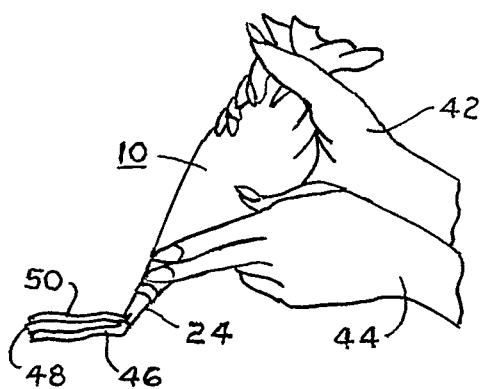
FIG. 4 is a perspective view illustrating the dispensing and guiding of the flow of multiple ribbons or strips of icing from the cake decorating pastry bag.

FIG. 4 illustrated the manner of using and guiding the cake decorating operation. It will be noted that for a right handed person the cake decorating pastry bag is gathered at the top in the right hand 42 and the bag is squeezed uniformily to induce a flow of icing or frosting out of all of the chambers 36, 38 and 40 through the decorating tip 24. As will be noted in FIG. 4 the left hand 44 of the operator is used to guide the outlet flow of icing or frosting onto the cake. The icing comes out of the tip 24 in straight lines 46, 48 and 50 from the chambers 36, 38 and 40.

It will be apparent that if desired a different decorating tip can be employed for example to spread the icing dispensed from the tip 24 to be flattened out, or even to dispense it as three separated ribbons with a space between them. In that case the decorating tip 24 would have separate discharge holes for the icing or frosting.

I claim:

1. A cake decorating dispenser for simultaneously applying a plurality of adjacently positioned different icings to cakes comprising a coupler base having a threaded lower end and an outwardly flared conically shaped upper end, a conical shaped cake decorating icing dispensing bag projected over the coupler base to provide a tight fit relative to the coupler base to insure a leak proof connection therewith, a conically shaped decorating tip selected from a plurality of assorted decorating tips having differently shaped outlets, a threaded coupler ring threadedly engaging the threaded lower end of the coupler base and the icing dispensing bag projected over the coupler base, an inwardly flared contraction of the threaded coupler ring engaging the conically shaped decorating tip to clamp the selected tip to the lower end of the coupler base, a conical shaped liner contoured to fit into the dispensing bag, and a plurality of intermediate panels in the conical shaped liner to provide a plurality of separate chambers to dispense a plurality of adjacent strips of decorative material.

2. The method of decorating cakes by simultaneously applying a plurality of adjacently positioned icing strips thereto, which comprises the steps of providing a coupler base having a threaded lower end and an outwardly flared conically shaped upper end, a conical shaped cake decorating icing dispensing bag projected over the coupler base to provide a tight fit relative to the coupler base to insure a leak proof connection therewith, selecting a conically shaped decorating tip from a plurality of assorted decorating tips having differently shaped outlets, applying a threaded coupler ring to threadedly engage the threaded lower end of the coupler base and the icing dispensing bag projected over the coupler base, providing a conical shaped liner adapted to fit into the conical shaped cake decorating icing dispensing bag and having a plurality of separate chambers to receive icing to be applied to cakes through the dispensing tip, and discharging icing from the chambers of the liner by applying pressure by hand to the dispensing bag to apply pressure to the chambers of the liner to discharge a flow of icing from each of the chambers of the liner to decorate the cake with a strip of icing including icing from each of the chambers.

* * * * *